Figure 10:
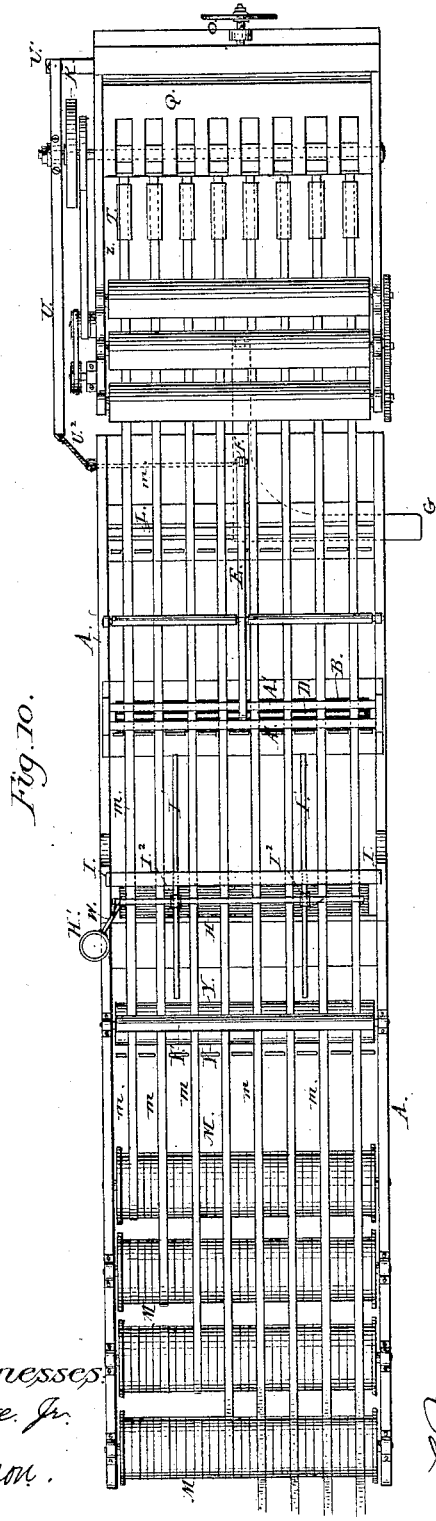

(No Model.) 2 Sheets—Sheet 1.
N. JENKINS.
SOLDERING MACHINE.
No. 245,957. Patented Aug. 23, 1881.
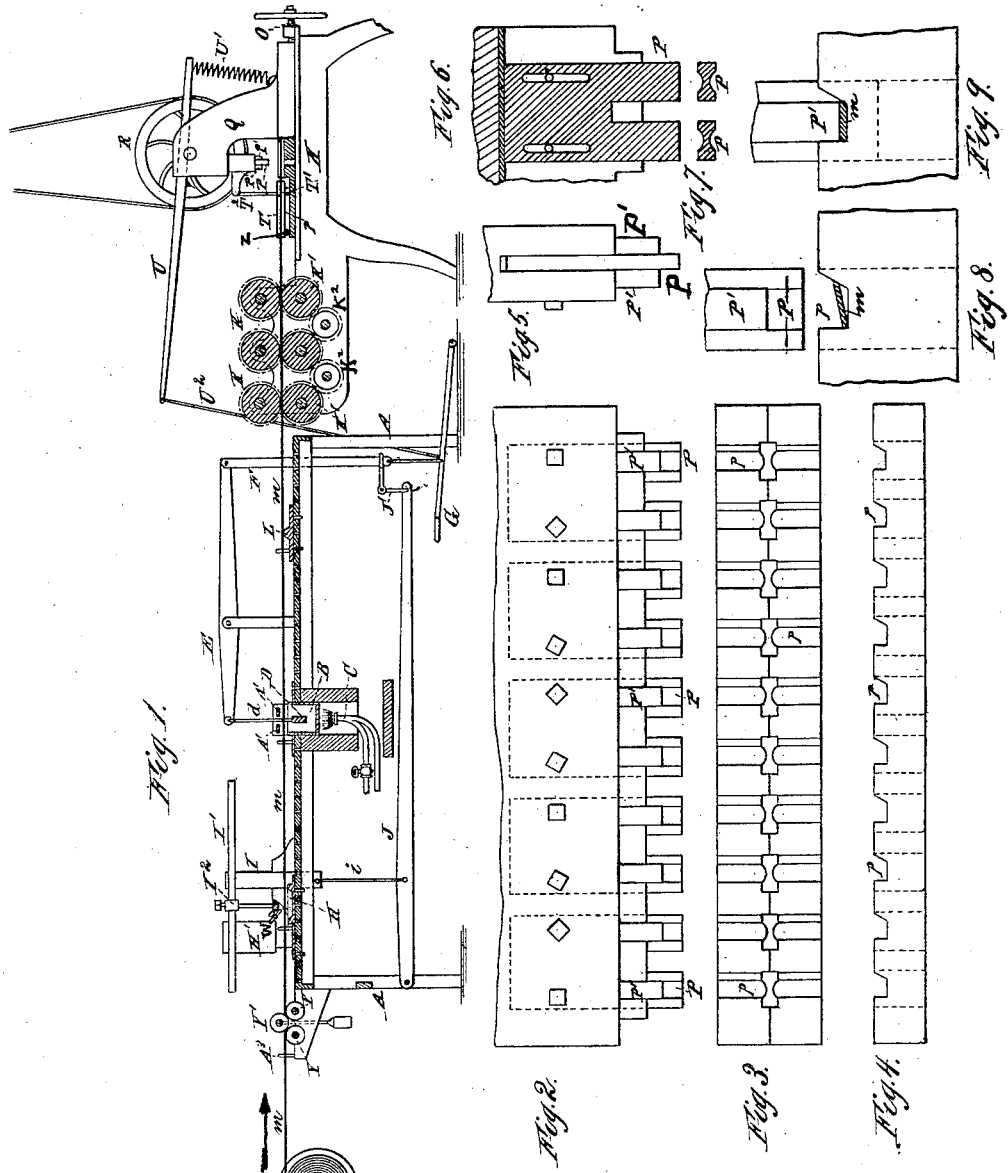
Witnesses=
Charles R. Searle.
W. Coelborne Brookes
Inventor=
Nicholas Jenkins
by his attorney
J. D. Stetson (No Model.)  N. JENKINS.  2 Sheets—Sheet 2.

SOLDERING MACHINE.

No. 245,957.  Patented Aug. 23, 1881.

Witnesses:  Inventor:
E. B. Foote, Jr.  Nicholas Jenkins
C. C. Stetson.  by his attorney
  J. D. Stetson

UNITED STATES PATENT OFFICE.

NICHOLAS JENKINS, OF NEW HAVEN, CONNECTICUT.

SOLDERING-MACHINE.

SPECIFICATION forming part of Letters Patent No. 245,957, dated August 23, 1881.

Application filed August 3, 1880. (No model.)

*To all whom it may concern:*

Be it known that I, NICHOLAS JENKINS, a citizen of the United States, residing in the city and county of New Haven, in the State of Connecticut, have invented certain new and useful Improvements in Soldering-Machines, of which the following is a specification.

My improvement is intended more especially for soldering what are to form the ends of springs formed of braided wire, as set forth in the patent to me dated March 23, 1880, No. 225,754; but it may be used with advantage in soldering wires and analogous slender strips of metal variously applied together, or for soldering single wires—as, for example, for attaching thorns or barbs to wires single or compounded, to serve as parts of wire fences. I will describe it as applied to the soldering of my braided-wire springs.

The wire springs are required in lengths of from five (5) to fifteen (15) inches, or thereabout, with their ends firmly soldered; but for convenience of manufacture the wires are braided in much greater length and wound on reels.

In the use of my invention I take the braided springs from a reel and apply the solder smoothly and in just sufficient quantity at the proper distances apart. The quantity of solder applied is very exactly limited. It is applied in a uniform stretch extending continuously across the breadth of the spring. The quantity may be nicely adjusted, so that when the solder is absorbed by the spring and properly distributed in the spaces along and between the several wires it secures a sufficient length to allow the division of the springs at that point by a suitable cutting-instrument to leave the ends of both springs well soldered. I employ a cutter in the form of a punch so shaped as to leave both the adjacent ends of the spring smoothly rounded.

It is desirable for many reasons that the time of the action be varied at will. In the most complete form of the invention I put it within the control of the operator to determine when the solder shall be applied.

I have devised means for making the same movement which applies the solder at one point to apply acid at another point at a proper distance therefrom, the point which is touched with acid at one operation being presented to receive the solder at a later operation of the apparatus.

I have devised means for applying power to effect the shearing off of the spring at the right point at a later stage than the soldering, and controlled by the same movement which controls or effects the application of the solder.

The following is a description of what I consider the best means of carrying out the invention.

The accompanying drawings form a part of this specification.

Figure 1 is a longitudinal section of my entire apparatus on a small scale. Fig. 2 is a front elevation of the series of upper dies on a larger scale. Fig. 3 is a plan view of the corresponding lower dies. Fig. 4 is an elevation of the same. Fig. 5 is a side elevation of the upper dies. Fig. 6 is a section through a pair of upper dies. Fig. 7 is a section through the cutting portion of the upper dies. Figs. 8 and 9 are on a still larger scale. These last-named figures are front elevations of a portion of the upper and lower dies, showing the manner of compressing the ends of the springs. Fig. 10 is a plan view of the entire machine.

Similar letters of reference indicate like parts in all the figures.

A is a stationary frame-work, certain parts of which will be designated by further letters.

B is a kettle or properly-constructed metallic vessel, containing the solder, kept in a melted condition by the flame from a sufficient number of Bunsen or other suitable gas-burners, C.

D is a deep and narrow piece of steel—ordinary saw-plate will serve well—alternately immersed in and partially lifted from the melted solder in B. It is operated by being connected by rods $d$ to a tilting frame, E, which is connected by a rod, F, to a treadle, G, operated by the foot of the attendant. A' A' are cross-bars, mounted rigidly a little distance apart above the springs $m$ which are to be soldered. At each immersion and elevation of the solder-plate D it receives and brings up on its narrow upper surface a quantity of the melted solder. The action of the treadle brings the piece D up into quite forcible contact with the springs, tending to deflect them upward; but the tendency is effectually resisted by the closely-adjacent cross-bars A'. The springs $m$ are unwound from spools M, mounted on a suitable stand. (Not represented.) The distance apart of the springs $m$ is uniformly spaced by being guided between pins $A^3$ near one end, and at several other points of the bench. They extend parallel from the pins $A^3$ a considerable distance to and beyond the soldering-vessel B.

H is a shallow tank, containing the fluid dilute muriatic acid with zinc, which it is desirable to apply to the springs at the points where the solder is to come, and at no other points. This tank is adjustable in position on the bench, so that its distance from the solder-vessel shall be just once or twice or other number of times the length of the springs which are to be ultimately cut off.

I are bars moving vertically in proper guideways provided on each side of the bench A. To each is rigidly connected a longitudinal bar, I', which receives and carries in adjustable positions a cross-bar, $I^2$, having an extension downward, as represented. The vertically-moving bars I carry the whole up and down, receiving their motion through connections $i$ from a lever, J, which is connected by a link, J', to an arm on the connection F. It follows that at each depression of the treadle G the lever J and the connected cross-bar $I^2$ are also depressed. The work is so conditioned that the depression of the cross-bar $I^2$ will carry the springs downward with it and touch them into the acid, so that the latter will properly wet a short length of each spring without affecting the other parts.

The distance of the acid application from the previously-treated point where the solder is being applied must be varied to allow for soldering by the same apparatus different lengths of springs. These distances I adjust by setting the acid-tank H and its connections at various distances from the solder-vessel B. The adjustment shifts forward and backward on the bench the acid-tank H and its connections, including the reservoir H', with a cock, W, for controlling the delivery, to maintain the supply of acid in the tank H at an exactly determined level.

Y Y are rollers mounted in fixed bearings, and Y' is a loaded roller, by which I maintain a suitable gripe on the several springs to maintain a uniformity of tension. To allow for irregularities in the sizes of the springs, and especially at the points which occasionally occur where two lengths of spring have been soldered together end to end, I coat the rollers Y Y' with some yielding material not shown. Vulcanized rubber might serve; but I give the preference to leather. The entire rollers Y Y' may be made of leather washers properly pressed together on iron shafts. The springs are held near the other end of the bench, and drawn forward intermittently at the proper times and to the proper extent by being held between several pairs of such rolls, (marked K K',) urged together with proper force by springs or weights. The entire series of points soldered at one movement of my apparatus all pass through any given pair of these rolls simultaneously, and, if the springs are extra thick or extra resilient at those points, the lifting of the upper roll accommodates them and still holds all uniformly; but there are other irregularities, particularly an occasional soldered joint where the ends of the long lengths of springs abut together and are joined by solder. These are liable to occur irregularly, and the lifting of the upper roll of a pair, which occurs to some extent notwithstanding the softness of the leather, tends to relieve the other wires from the gripe of the rolls. Having two or more pairs insures that one pair will hold the springs while another pair is in that imperfect condition, the upper roll lifted by a bunch in one spring, while there are no corresponding bunches in the other springs. In the most complete form of my invention I use three pairs of such rolls. These rolls are geared together by gear-wheels $K^2$, and all may be operated by a hand-crank. (Not shown.)

I propose, where the amount of work to be done will justify the expense, to operate the rolls intermittently by elaborate machinery, (not represented;) but I have found a hand-crank mounted on the shaft of one of the rollers K, operated by the attendant, to be efficient. It is easy to turn these rolls K, and to work the treadle G at the proper intermittent periods, and to attend sharply to the success of the aciding and soldering operations.

L is an adjustable gage, through which the springs are guided after their treatment with the solder. This is set at a distance from the soldering-points exactly equal to the length of one spring, or twice that distance, so that it serves as a gage. When the white points in the springs where the solder was applied reach the gage L, carrying spacing-pins $A^3$, it is time for the operator to stop turning the rollers K and to depress the treadle G.

P P, &c., are a series of peculiarly-shaped punches working in a strong support, Q, and operated by belts from any convenient power acting on pulleys R, subject to the control of the attendant. Through this punching-machine the springs $m$ are properly guided. The upper dies, P, have each the section shown in Fig. 7, the lower dies being correspondingly formed, so that each spring shall be cut off with a rounded end.

The whole of the punching mechanism rests on the bed N, and is guided in ways, so that the punch can be moved forward and backward on the bed N by turning the screw O. This allows of the adjusting of the points where the springs are cut off, so that I can properly treat springs of different lengths.

The springs are guided from the intermittent driving-rolls K through a series of approximately close-fitting flattened tubes, T, which are capable of a slight vertical motion at the ends nearest the punch. The other end of each is pivoted at $z$ to the frame Q of the punch, so as to be adjusted forward and backward with it.

U is a lever, the depression of which determines the period of action of the punch. The lever U is held up by a spring, U', and is depressed at the proper moment by the wire U², which connects it to the treadle G. Thus arranged, the depression of the lever G effects the three functions of elevating the soldering-plate D, and thus soldering the whole series of springs, depressing the bar I², and thus immersing in the acid the several springs, and putting in action the punch P, and thus cutting off the several springs all at the proper points.

The solder applied by my apparatus is very uniform in amount, and is laid in a uniform position at each joint. It is easy by means of slight compression to shape the ends of the springs with uniformity. I provide for effecting this in connection with the shearing or punching which separates the lengths. On the same strongly-moving head which carries the punches are a series of projections, P', extending out on each side in such position that when the punch-head is depressed to shear off the springs the projections also press upon a certain length of the spring each side of the sheared point. This reduces the soldered parts of the spring to a uniformity of thickness. Now, by making these projections of a suitable width and causing them to depress the springs a little into a groove of corresponding width, having one or both sides a little flaring to promote the entrance of the spring, I am able to reduce the width of the springs so that all shall be also uniform in width. Figs. 7 and 8 show the arrangement for this purpose. These figures show the grooves $p$, of slightly flaring form, but flat bottom; and Fig. 5 shows the projections carried on the punch-head, which force the soldered ends of the springs down into the grooves and leave them uniform. The springs are liable to bind and to require considerable force to detach them from the grooves $p$. I provide for lifting the springs after each shearing operation. The freshly-cut ends of some or all the springs are liable to remain in contact with the upper die as it rises, and be carried up therewith; or if, to avoid this, the springs are held down to a fixed position, they are liable to remain so much depressed that on their being moved forward they will catch against the other side of the hole in the lower die.

The tubes T are moved by the action of the press after each operation, being elevated a little, enough to clear the springs from the grooves $p$, and also to lift them clear of the lower die. The weight of the tubes will forbid the springs to remain in contact with the upper die or to move up therewith. Before the next action of the punch the tubes T and their contained springs are again depressed, so that the springs shall at the moment of cutting lie fairly across the holes in the lower die, ready to be properly sheared. In this position, also, they lie sunk to some extent in the flaring grooves $p$, ready, on the descent of the punch-head, to be forced down by the projections P' and compressed firmly in the bottom of the grooves $p$. I effect this raising-and-lowering movement of the back ends of the tubes T by means of the movable cross-bar T', which extends across under them, and is connected at each end, by a wire, T², or other connection, to the punch-head above. This connection is a little slack, like the links of a chain. At the commencement of the descent of the punch-head it lowers the tubes T until they attain the proper level. Then the bar T' rests on a suitable support, and the further descent of the punch-head effects the punching without a further lowering of the tubes or their contained springs. On the ascent of the punch the first portion of the movement clears the punches from the springs. The last portion lifts the tubes T, and with them the springs, sufficient to clear the springs from the groove $p$ and from the lower die, as above explained.

The plate D should be sufficiently broad to hold its lower edge immersed when in its highest position. It is thus certain to maintain its temperature by its continued contact with the melted metal in all positions.

I term the material $m$ "springs," meaning, by preference, braided constructions of hard brass wires, with or without certain straight longitudinal wires inclosed or associated to aid in maintaining the form and insuring exactness of length. They may be exactly like the springs shown in my patent of March 23, 1880, above referred to, except that for treatment in this soldering apparatus the ends are maintained of the same size, or about the same size, as the other portions of the spring.

The soldering apparatus may be used with success in treating other constructions composed of aggregated wires or of one wire when it may be necessary to solder at intervals thereon—as, for example, attaching barbs or spurs of metal to single wires or wire cords for wire fences. I use the term "springs" $m$ in this paper as indicating wires or analogous metallic cords for any purpose which require to be soldered at intervals.

The quantity of solder applied to each spring may be adjusted very accurately by varying the conditions at the upper edge of the plate D. If it carries up too much solder, the plate D should be taken out of the apparatus and its upper edge made thinner. If it shall be found in any case that this has been carried too far, a given width of edge may be made to apply more solder by planing or otherwise grooving a channel along the upper edge. I find by trial that the springs properly touched with acid will suck out the solder to the bottom of a considerable depth of groove.

Other adjustments of the mechanism may be made, which will be obvious to any good mechanic. The treadle G may be shortened or lengthened, or the connected spring may be varied in force to adjust it to the weight of the feet of different operators. The graduation of the temperature of the solder in the vessel B is effected by controlling the flow of gas with great nicety. A coal-fire may be employed where gas is not available, suitable precautions being taken for insuring an equable temperature.

Various modifications may be made in the forms and proportions of the details. Some parts of the invention may be worked with advantage without the whole; but I prefer the whole used together, as here shown. I can make the cross-bars A' movable, and cause them to be depressed upon the edges of the vessel B to hold the springs very firmly at the moment of soldering. To effect a change of the length of the springs produced, I turn the screw O, and thereby move the carriage Q and its attachments to the required distance to cut off the longer springs required. Then I shift the gage L to correspond. Then I shift the cross-bar I² on the T-pieces I', so as to depress at the corresponding distance from the soldering-point, and then shift the tank H with its connected supply H'. I can make the machine solder at two or more points at once by connecting two or more of the soldering-plates D and two or more solder-vessels, B, or having one such vessel sufficiently wide. In such case there should be corresponding duplication of the means A' for resisting the tendency of the springs to be deflected up out of place. I can treat only one spring or wire instead of a series. This may be expedient in soldering barb fence-wire or analogous material having arms or projections which would cause a number of them to interfere with each other. In all these cases my apparatus has the advantage of lifting a definite quantity and presenting it at the right points with mathematical exactness.

Various adjusting means other than those represented may be employed for conveniently changing the position of the parts L and H and for holding them firmly. I have shown each of these parts equipped with pins, and the bench A as bored with a great number of holes, into any of which the pins may be shifted.

I claim as my invention—

1. A soldering-machine having means, M, for supplying material, $m$, to be soldered, rolls Y Y' for maintaining tension, rolls K K', operated intermittently, for moving forward the springs or material $m$, held at a proper distance apart, and means D, moved up and down, for applying solder simultaneously to the whole series, combined and arranged for joint operation as herein specified.

2. The soldering-plate D, having considerable depth and a properly-formed upper edge, for lifting a quantity of solder, in combination with means for giving it an up-and-down motion in the solder-vessel B, a furnace, C, for maintaining the solder at a high temperature, and means, K', for moving forward the springs at the intervals between the successive solderings, as herein specified.

3. The vessel H and movable depressor I I' I², in combination with means for moving the springs $m$ intermittently, and with means, B D, and their connections, for soldering at another point, as herein specified.

4. The soldering device D and the aciding device I², with their respective connections, in combination with each other and with a single treadle, G, arranged to operate both simultaneously at the will of the operator, as herein specified.

5. The adjustable gage L, adapted to indicate to the eye when the soldered points have been moved forward to the required extent, in combination with the soldering means B D and their connections, and with the acid-tank H and depressor I² and their connections, the parts being adjustable in position to allow of the manufacture of springs of different lengths, as herein specified.

6. The punches P and means for operating them at will, in combination with provisions, K K', for feeding forward the springs, and means, B D, for applying solder uniformly to each, as herein specified.

7. In a machine for soldering springs and analogous articles, as shown, the notches $p$ $p$ in the bed, and projections P' on the punch-head, arranged for joint operation as herein specified.

8. In combination with the punches P, the tubes T, adapted to smoothly inclose the springs, and means, T' T², for moving the tubes and their contents, as herein specified.

9. In combination with a power machine for shearing, having a device, U, for throwing it into and out of action, a soldering-machine having a device, D, for effecting the contact of the solder with the points to be soldered, and connections from both to a single treadle, G, operated at will, as herein specified.

In testimony whereof I have hereunto set my hand, at New York city, this 28th day of July, 1880, in the presence of two subscribing witnesses.

NICHOLAS JENKINS.

Witnesses:
WM. C. DEY,
CHARLES R. SEARLE.